(12) United States Patent
Chao et al.

(10) Patent No.: US 10,871,622 B2
(45) Date of Patent: Dec. 22, 2020

(54) SUSPENSION SYSTEM OF SINGLE-AXIS OPTICAL ACTUATOR

(71) Applicant: Min Aik Technology Co., Ltd., Taoyuan (TW)

(72) Inventors: King-Sheng Chao, Taoyuan (TW); Shih-Po Yeh, Taoyuan (TW); Ching-Hsuan Chuang, Taoyuan (TW); Wei-Lung Lai, Taoyuan (TW)

(73) Assignee: MIN AIK TECHNOLOGY CO., LTD., Taoyuan (TW)

( * ) Notice: Subject to any disclaimer, the term of this patent is extended or adjusted under 35 U.S.C. 154(b) by 105 days.

(21) Appl. No.: 16/248,775

(22) Filed: Jan. 16, 2019

(65) Prior Publication Data

US 2020/0225437 A1 Jul. 16, 2020

(51) Int. Cl.
*G02B 7/02* (2006.01)

(52) U.S. Cl.
CPC ..................................... *G02B 7/02* (2013.01)

(58) Field of Classification Search
CPC ..... G02B 7/02; H02K 41/0356; G03B 21/142
See application file for complete search history.

(56) References Cited

U.S. PATENT DOCUMENTS

2016/0161757 A1* 6/2016 Hee .................. G02B 7/026
359/557

* cited by examiner

*Primary Examiner* — Wen Huang
(74) *Attorney, Agent, or Firm* — Leong C. Lei

(57) ABSTRACT

A suspension system of a single-axis optical actuator is provided, including an elastic suspension plate in the form of a frame having two opposite ends each extended, through a beveled edge and a bending section, to form a cantilever arm. The elastic suspension plate is provided with a magnetic device on one side thereof. The cantilever arms are supported on a reinforcement frame to carry an optical lens. When an electric current is supplied through a connector to the magnetic device of the actuator, a reciprocal attraction or repulsion force is generated and applied to one side of the elastic suspension plate so that the elastic suspension plate may function as an oscillation member with an imaginary axis line between the two bending sections of the frame body as an axis to carry the optical lens to generate fast and position-constrained oscillation at two sides.

8 Claims, 15 Drawing Sheets

SUSPENSION SYSTEM OF SINGLE-AXIS OPTICAL ACTUATOR

TECHNICAL FIELD OF THE INVENTION

The present invention relates generally to a suspension system of a single-axis optical actuator, and more particularly to a suspension system of a micro optical actuator that is used in a projection apparatus and demonstrates characteristics of oscillation in a uniaxial direction in order to make the oscillation of the actuator more stable and more accurate to thereby greatly improve the resolution and stability of image projection.

DESCRIPTION OF THE PRIOR ART

Advanced optical projection systems must meet the requirement of size compactness and good resolution of an image projected and also needs to have a low cost. Under such three conditions, designs of advanced optical projection systems, of which an example is illustrated in FIGS. 11 and 12, are such that an image of a microchip panel 92 (such as digital micromirror device (DMD)) travels through a prism 91, an actuator 80, and a lens 90 to be projected onto a curtain (not shown), wherein projection light, during travel, transmits through a lens arranged in the actuator 80 and, through fast repeated oscillation of the actuator 80 (to change the projection site), the location of the image is constantly changed to thereby achieve improvement of resolution.

A commonly adopted structure of the prior art actuator 80, which is shown in FIGS. 13, 14, and 15, comprises a base 81. The base 81 is formed with a mounting opening 801 in a central area thereof. On each of two opposite locations of the mounting opening 801, a bearing 82 and a rotary axle 83 are provided. An oscillation member 84 is arranged between the two rotary axles 83. The oscillation member 84 is made up of a carrier 841 and a lens 842 so that when the actuator is acted upon electromagnetically from a peripheral area thereof (not shown), the oscillation member 84 is caused to oscillate about an axial lines L1 defined between the two sets of bearing 82 and rotary axle 83, so that two opposite side portions of the oscillation member 84 are caused to regularly oscillate up and down in order to change the projection sites. This is the most commonly adopted solution.

The structure of the prior art actuator 80, however, suffers certain imperfection of design and exhibits the following shortcomings:

(1) In the known device, the bearings 82 and rotary axles 83 are arranged as pivot points. However, there is always a clearance between the bearing 82 and the rotary axle 83, so that when the two opposite side portions oscillate up and down quickly, the pivot point itself may jitter up and down or the rotary axle 83 may undergo axial positional deviation within the bearing 82. This would causes frequent variation of the site of projection resulting from such a clearance and the axial positional deviation, so that unpredictable error may result, leading to instability of resolution. This is a major drawback of the prior art device.

(2) Arranging the bearings 82 on the base 81 makes it not possible for the size of the actuator 80 to be further reduced or thinned. This imposes certain constrain to the size of a final product, lacking potential of future product improvement, this being another drawback.

(3) The cost of the actuator 80 would be high with the bearing 82 and the rotary axle 83 being used as a pivot point and thus the fabrication expenditure is increased and maintenance and replacement carried out after wearing are also of high costs. This is a further drawback of the prior art device.

Further, a different way that is adopted to take the place of the bearing as a pivot point is known, where a rectangular spring plate is used to define a torque axis. This makes it possible to reduce the cost. However, since the single rectangular spring plate is not provided with a fixed pivot point when oscillating on the left and right sides thereof, each time the oscillation member oscillates, the pivot point of the spring plate moves about. Thus, although the fabrication cost is reduced, due to the position of the pivot point for oscillation being not fixed, the rotation axis of the spring plate varies all the time, leading to a significant drawback of uncontrollability of the projection site. In addition, in assembling the spring plate at two opposite ends thereof, a slight angular deviation would make the rotational axes not collinear with each other and easy deviation of the projection site may result. This is another drawback.

SUMMARY OF THE INVENTION

The primary objective of the present invention is a unique elastic suspension plate is provided to serve as a main axis of a suspension system. The elastic suspension plate is arranged as a frame body having two opposite ends each extended, through a beveled edge and a bending section, to form a cantilever arm. The elastic suspension plate is provided with a magnetic device on one side thereof. The cantilever arms are supported on a reinforcement frame to carry an optical lens. When an electric current is supplied through a connector to the magnetic device of an actuator, a reciprocal attraction or repulsion force is generated and applied to one side of the elastic suspension plate so that the elastic suspension plate may function as an oscillation member with an imaginary axis line between the two bending sections of the frame body as an axis so that the bending sections function as support points for oscillation of the elastic suspension plate, making positioning reliable and accurate. The optical lens so carried is allowed to generate fast and position-constrained oscillation at two sides to achieve accurate positioning of light and easy assembly as primary features of this invention.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
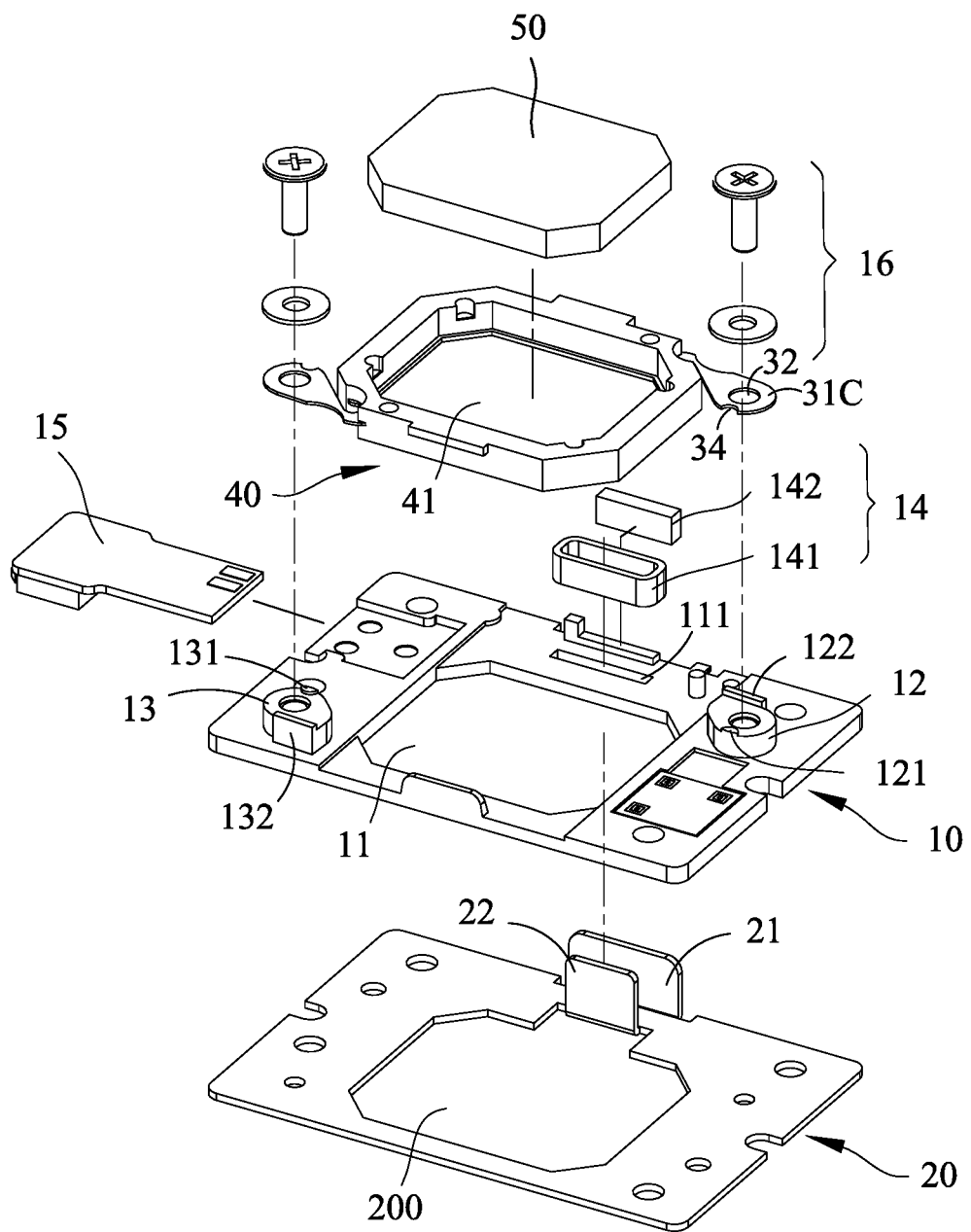
FIG. 1 is an exploded view illustrating a first embodiment of the present invention.
Figure 2:
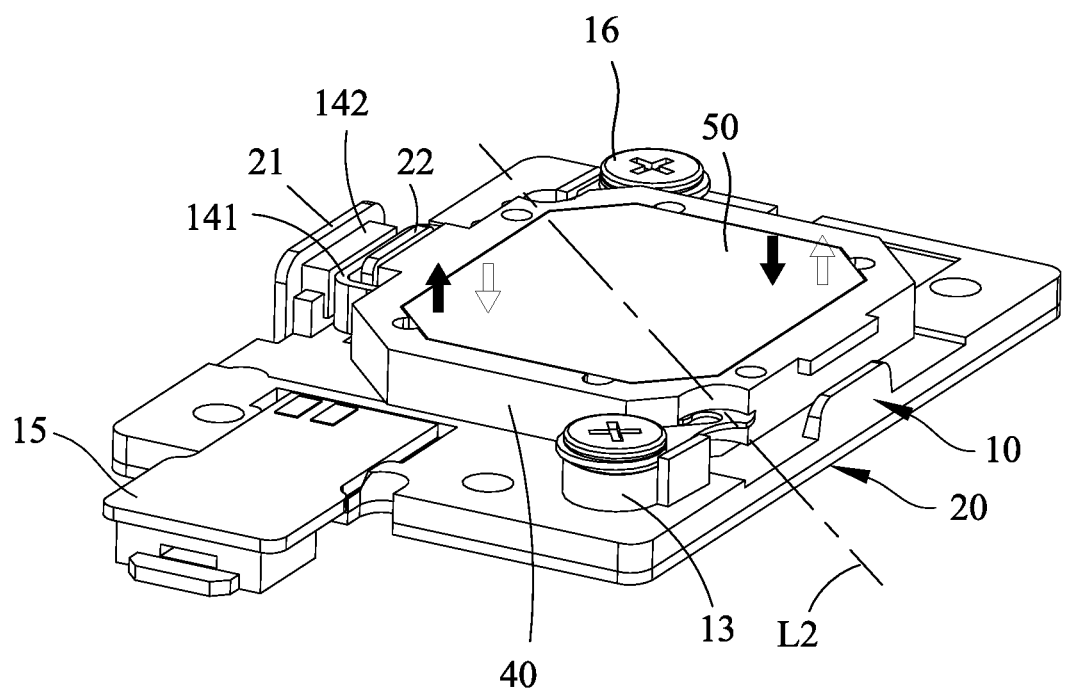
FIG. 2 is a perspective view illustrating the first embodiment of the present invention in an assembled form.
Figure 3:
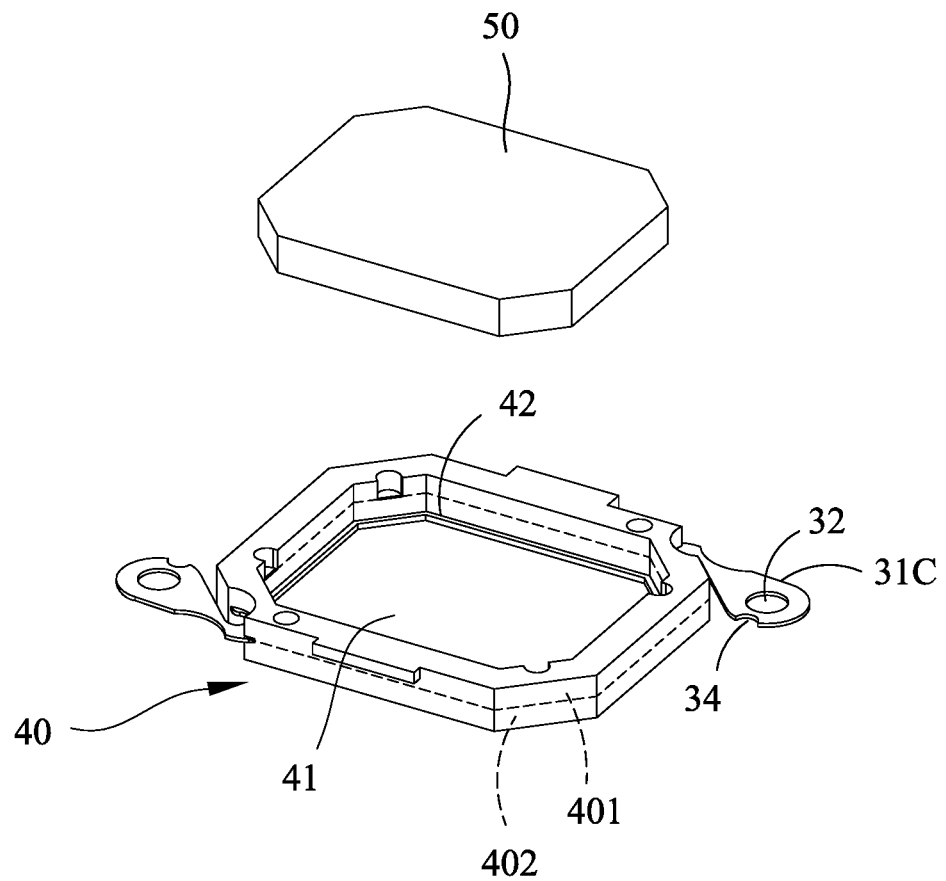
FIG. 3 illustrates a relationship among an elastic suspension plate, an oscillation member, and an optical lens according to the first embodiment of the present invention.
Figure 4:
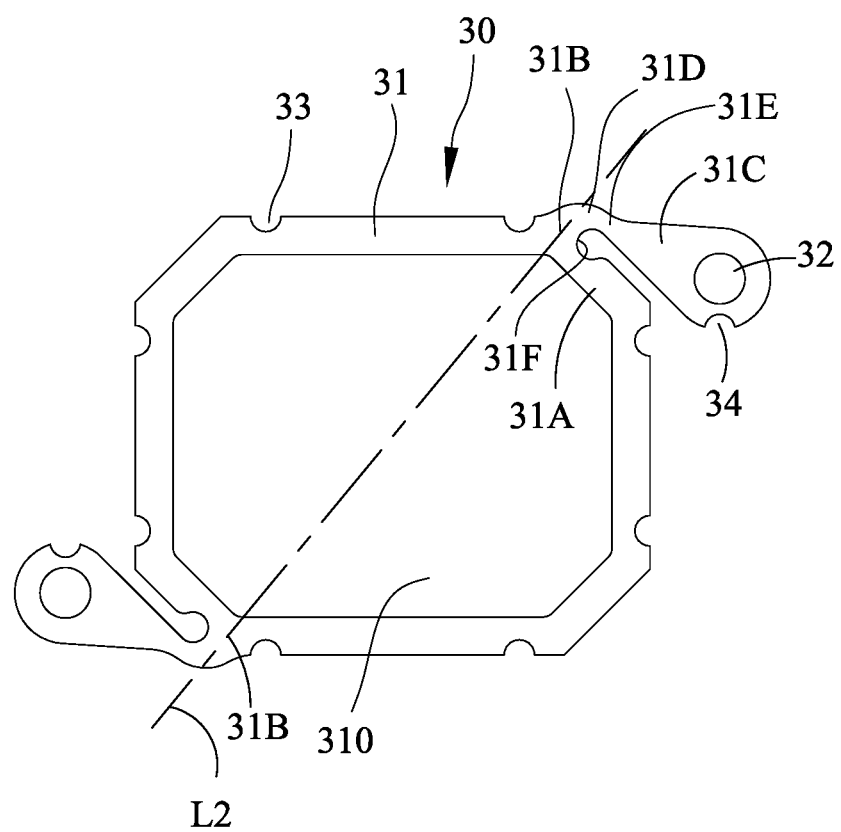
FIG. 4 is a plan view illustrating a structure of an elastic suspension plate according to the first embodiment of the present invention.

Referring to FIGS. 1 and 2, an example of application of a suspension system of a single-axis optical actuator according to a first embodiment of the present invention is shown, comprising, at least:

a base 10, which is formed with a rectangular light transmission opening 11 in a central area thereof and is provided, in a manner of being raised therefrom, with a support post 12, 13 on each two opposite sides along a diagonal line of the light transmission opening 11, wherein each of the two support posts 12, 13 has an end, which is provided with a positioning marking 121, 131 (a positioning tenon being taken as an example in this invention) at one side thereof and is also provided, on an opposite side thereof, with a positioning plate 122, 132; a magnetic device 14 (which is made up of a coil and a magnet) is provided on a long side of the rectangular light transmission opening 11; and a connector 15 is provided at an end of the base 10;

a reinforcement frame 20, which is preferably made of metal and is located under the base 10 and is formed with a light transmission opening 200 in a central area thereof, wherein a supporting plate 21 and an insertion plate 22 are provided on and projecting from one side of the light transmission opening 200 to extend through the base 10 in order to retain and fix the magnetic device 14; wherein in an embodiment, an insertion hole 111 is formed in the base 10 at a location where the magnetic device 14 is arranged to receive extension of the insertion plate 22 of the reinforcement frame 20 therethrough, with the supporting plate 21 abutting one side edge of the base 10, so as to fix, through extension therethrough, the coil 141 and the magnet 142 of the magnetic device 14;

an elastic suspension plate 30, which as shown in FIGS. 1 and 4, is made in the form of a flat metal plate and comprises a frame body 31 that defines a light transmission opening 310 in a center thereof and the frame body 31 is provided with a beveled edge 31A at each of two opposite sides along a diagonal line thereof, wherein the beveled edge 31A is provided with a bending section 31B formed on an outside thereof and extended outward from the frame body 31 to form a cantilever arm 31C, the cantilever arm 31C being formed with a reduced necking section 31E at an inner end thereof adjacent to the bending section 31B and being also formed with a fastener hole 32 in an outer end thereof; a reinforcement section 31D is formed by thickening a part of the bending section 31B where stress concentration readily occur in order to make the bending section 31B endurable of increased stresses; the cantilever arm 31C extended outward from the frame body 31 has an inner side that forms, together with an outer side of the beveled edge 31A, a spacing gap S therebetween, wherein in the embodiment illustrate, the inner side of the cantilever arm 31C is made parallel to the outer side of the beveled edge 31A and the bending section 31B is formed with a circular arc chamfering corner 31F on an inner edge thereof; and, the frame body 31 has a peripheral edge which is provided with a plurality of fitting notches 33 recessed therefrom, the cantilever arms 31C being each provided with a positioning section 34 formed in one side thereof, an example of the positioning section 34 being a recess; and an oscillation member 40, which, as shown in FIGS. 1, 2, and 3, comprises a plastic carrying platform that is formed with a light transmission opening 41 in a central area thereof, wherein the light transmission opening 41 has an inner flange thereof that is formed as a lens support trough 42 for carrying and fixing an optical lens 50 therein; the oscillation member 40 is formed, in an integral manner, as a unitary structure that encloses the elastic suspension plate 30 therein for being combined therewith with the fitting notches 33 formed in the peripheral edge of the frame body 31 of the elastic suspension plate 30 providing an increased combination force with respect to the oscillation member 40, wherein the oscillation member 40, although being made as an integrally formed unitary structure in the preferred embodiment, can alternatively be made up of two parts, which are a top seat 401 and a bottom seat 402, which are combined together.

Figure 5A:
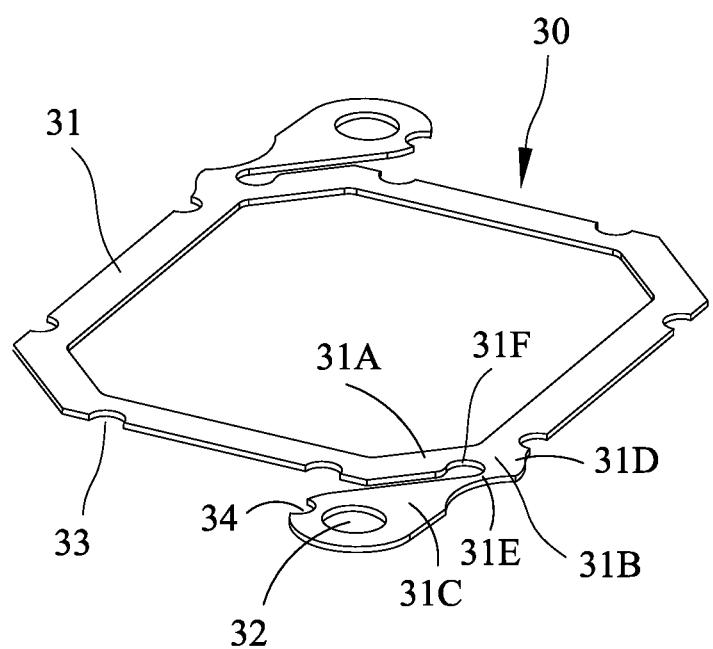
FIG. 5A is a perspective view illustrating the structure of the elastic suspension plate according to the first embodiment of the present invention.
Figure 5B:
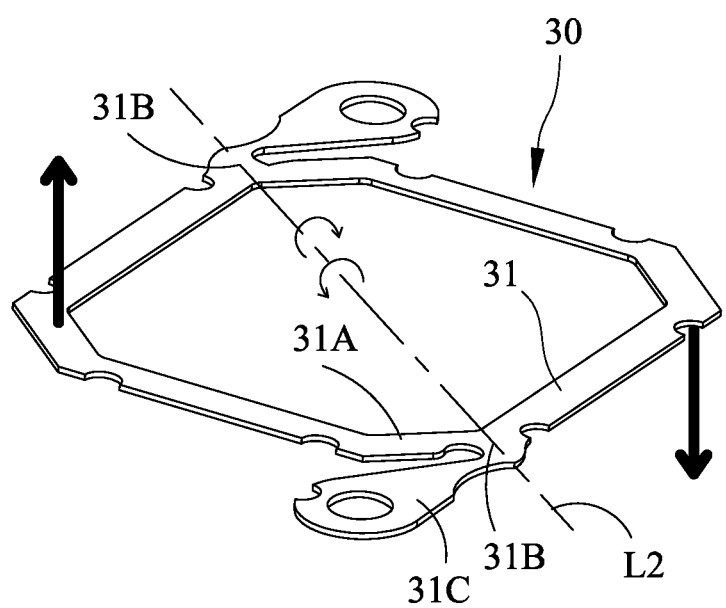
FIG. 5B is a schematic view illustrating operation of the elastic suspension plate according to the first embodiment of the present invention.
Figure 6:
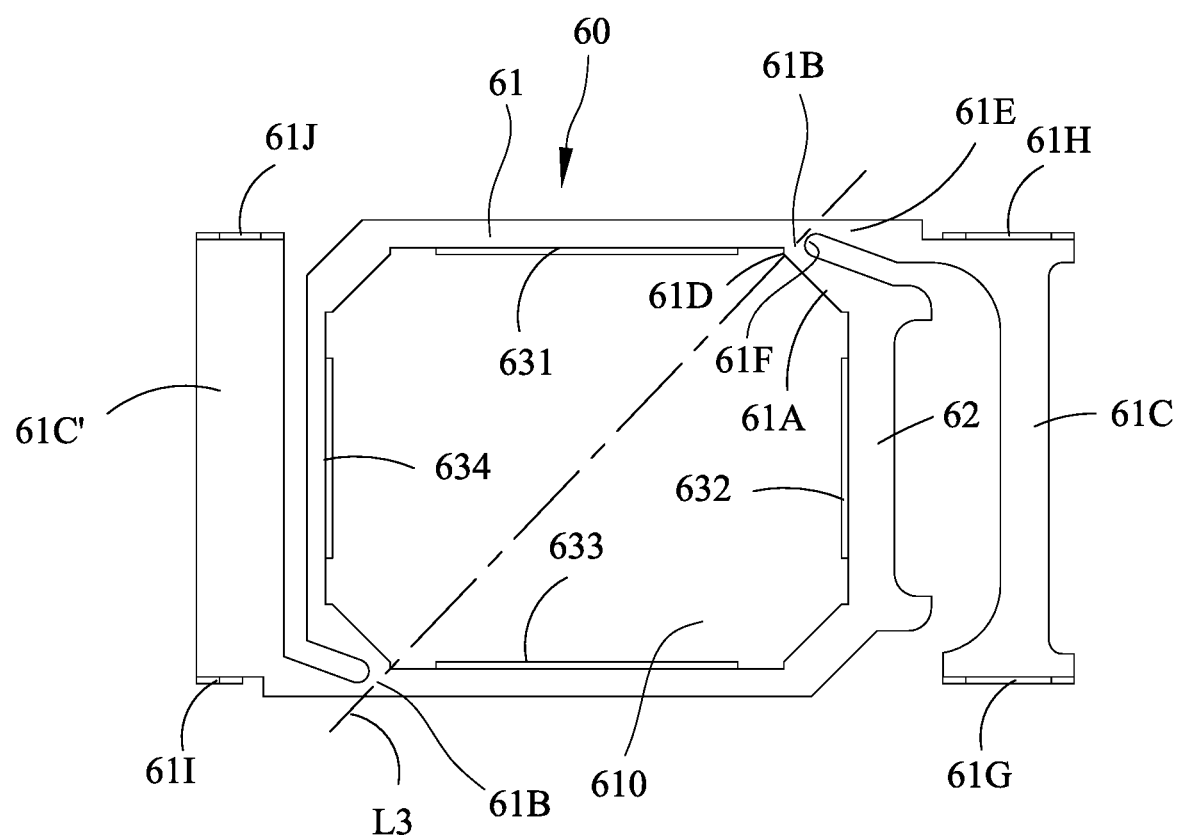
FIG. 6 is a plan view illustrating a structure of an elastic suspension plate according to a second embodiment of the present invention.

To use the present invention, referring to FIGS. 1, 2, and 5B, two fasteners 16 are respectively set through the fastener holes 32 formed in the outer ends of the cantilever arms 31C that are extended from two ends of the elastic suspension plate 30 and then fixed (such as by means of screwing, riveting, fitting, and snapping) to the two support posts 12, 13 of the base 10 so that the oscillation member 40 set on and covering the elastic suspension plate 30 may receive, carry, and support the optical lens 50 thereon, wherein the fasteners 16 set at the two ends of the elastic suspension plate 30 may serve as support points to support the oscillation member 40 that carries the optical lens 50 above the light transmission opening 11 of the base 10 in a suspending manner, so that when an electrical current is supplied through the connector 15 to cause the magnetic device 14 provided on the base 10 to generate an effect of attraction or repulsion, one side of the oscillation member 40 is subjected to the effect of magnetic attraction or repulsion generated by the magnetic device 14 to have the oscillation member 40 moved so that two sides of the oscillation member 40 are caused to oscillate quickly about an axis defined by an imaginary axis line L2 between flexing points of the two bending sections 31B (as shown in FIGS. 2, 4, and 5B).

The elaboration of this invention is that, as shown in FIGS. 4, 5A, and 5B, the cantilever arms 31C extended from two ends of the elastic suspension plate 30 and the beveled edges 31A of the frame body 31 form a bending of an acute angle and when relative twisting occurs between the two cantilever arms 31C and the frame body 31, the bending sections 31B function as fixed support points, and the support points, due to circular arc bending being formed between the cantilever arms 31C and the beveled edges 31A of the frame body 31, are constrained at the fixed positions and are not allowed to readily move or shift, whereby a rotation angle of each round of repeated oscillations of the oscillation member 40 can be accurately fixed and the light projection site of the actuator can be made extremely precise, resulting in bettering of resolution and stability of projection of images.

As shown in FIGS. 1 and 2, in order to make the light projection site achieved with the elastic suspension plate 30 and the oscillation member 40 that are supported on and between the two support posts 12, 13 of the base 10 even more accurate, the cantilever arms 31C of the elastic suspension plate 30 are structured such that outer sides thereof are made in the form of straight edges that exactly abut the positioning plates 122, 132, respectively, for accurate positioning. Further, the positioning sections 34 (which can be for example recesses) provided on the cantilever arms 31C of the elastic suspension plate 30 can be set to mate with the positioning markings 121, 131 provided on the two support posts 12, 13 of the base 10 so that improved accuracy of assembly can be achieved.

Figure 7A:
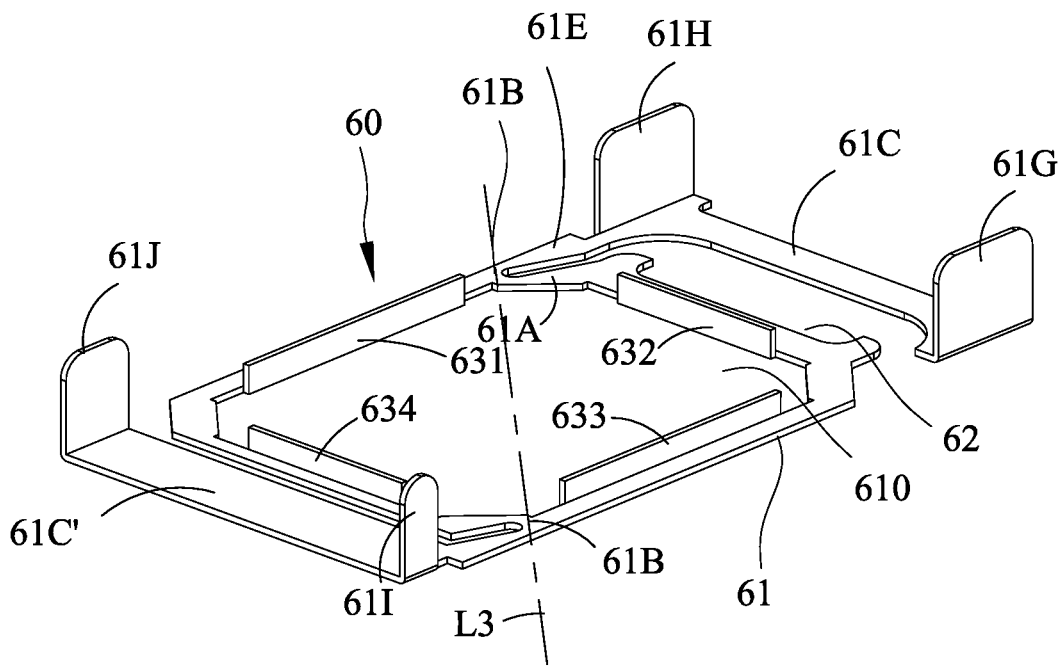
FIG. 7A is a perspective view illustrating the structure of the elastic suspension plate according to the second embodiment of the present invention.
Figure 7B:
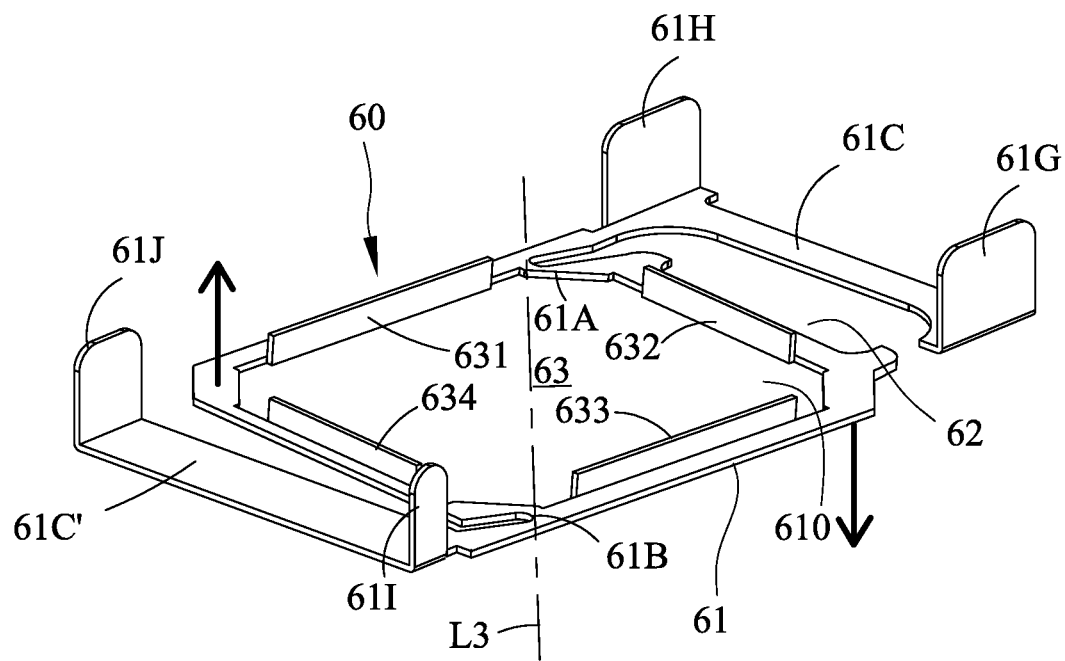
FIG. 7B is a schematic view illustrating operation of the elastic suspension plate according to the second embodiment of the present invention.
Figure 8:
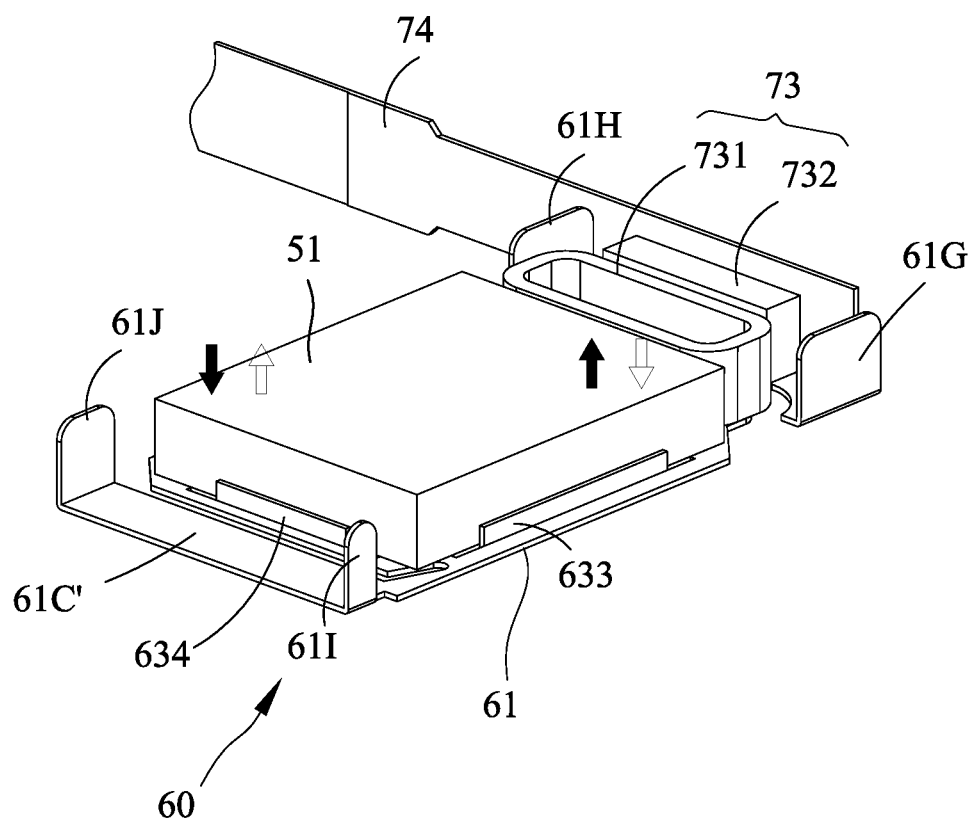
FIG. 8 is a perspective view illustrating the second embodiment of the present invention in an assembled form.
Figure 9:
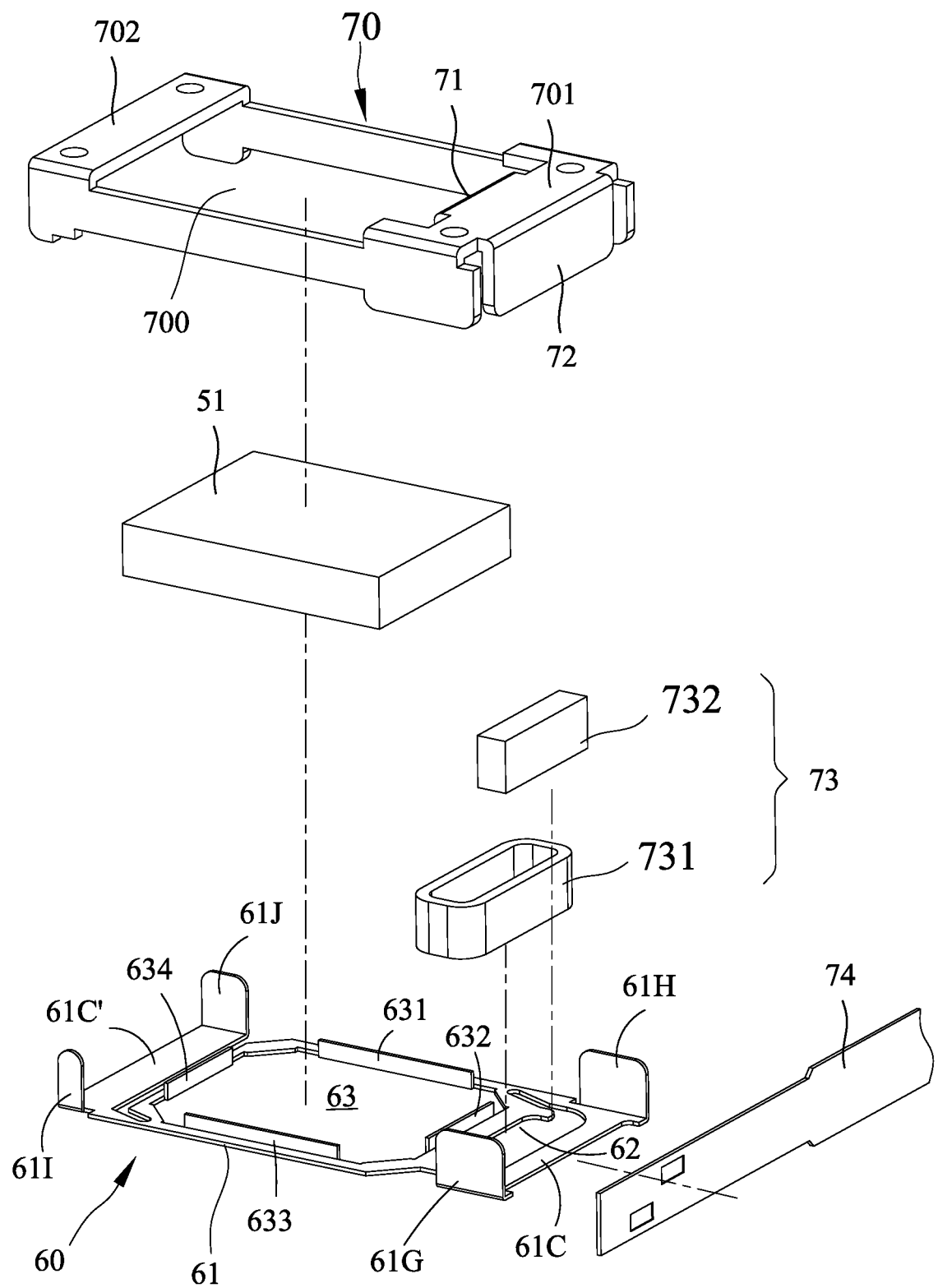
FIG. 9 is an exploded view illustrating the second embodiment of the present invention.

The above description is concerned about the first embodiment of the present invention, which is provided for one of the specifications that are commonly used (such as 0.33 mm micro projection panel or digital micromirror device (DMD)). However, when used with another commonly used specification (such as 0.23 mm micro projection panel or DMD), the features of this invention must also be involved. Referring to FIGS. 6, 7A, 7B, 8, and 9, an elastic suspension plate 60 is made in the form of a flat metal plate and comprises a frame body 61 that defines a light transmission opening 610 in a center thereof and the frame body 61 is provided with a beveled edge 61A at each of two opposite sides along a diagonal line thereof, wherein the beveled edge 61A is provided with a bending section 61B formed on an outside thereof and extended outward from the frame body 61 to form a cantilever arm 61C, 61C', the cantilever arm 61C, 61C' being formed with a reduced necking section 61E at a location adjacent to the bending section 61B; however, the two cantilever arms 61C, 61C' are structured to extend outward to form two elongate bodies that are respectively parallel to two opposite side edges of the frame body 61, and the two cantilever arms 61C, 61C' are each provided with fitting wing plates 61G; 61H, 61I, 61J at two ends thereof, the frame body 61 being provided in one of the side edges thereof that is opposite to one 61C of the cantilever arms with recessing that forms a mounting trough 62, a magnetic device 73 being provided on the mounting trough 62 and connected to a connector 74; a reinforcement section 61D is formed by thickening a part of the bending section 61B where stress concentration readily occur for the purpose of enduring increased stresses; an inner side of the bending section 61B is formed with a circular arc chamfering corner 61F; and, the frame body 61 is provided with inlay pieces 631, 632, 633, 634 that are formed through stamping or pressing on a periphery of the light transmission opening 610 so that the frame body 61 and the inlay pieces 631, 632, 633, 634 collectively form an oscillation member 63 that carries and supports an optical lens 51 (as shown in FIGS. 7B, 8, and 9).

Figure 10:
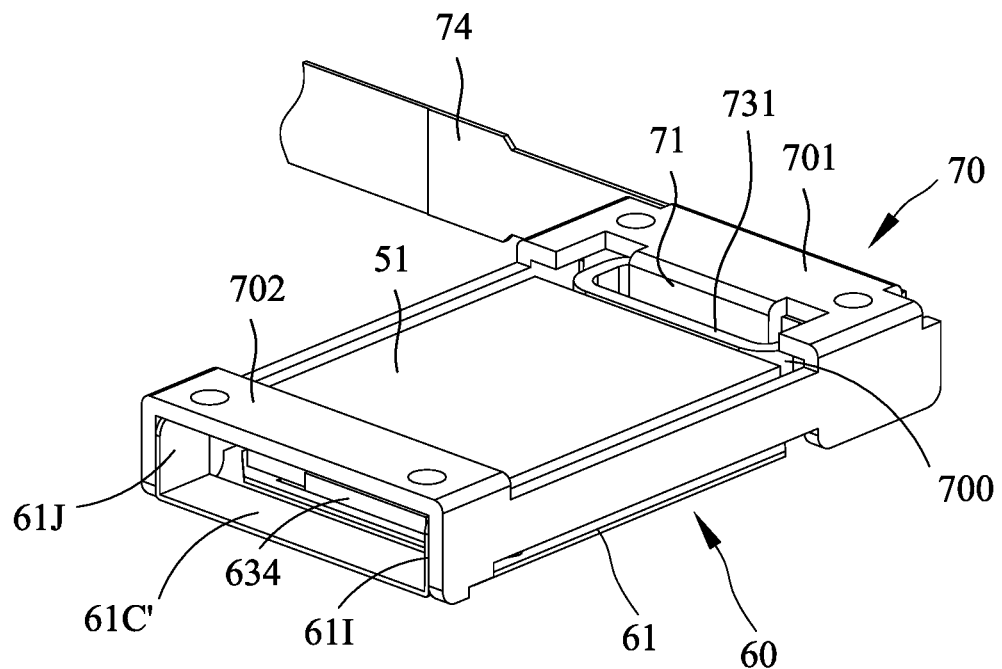
FIG. 10 is a perspective view, taken from a different angle, illustrating the second embodiment of the present invention in the assembled form.
Figure 11:
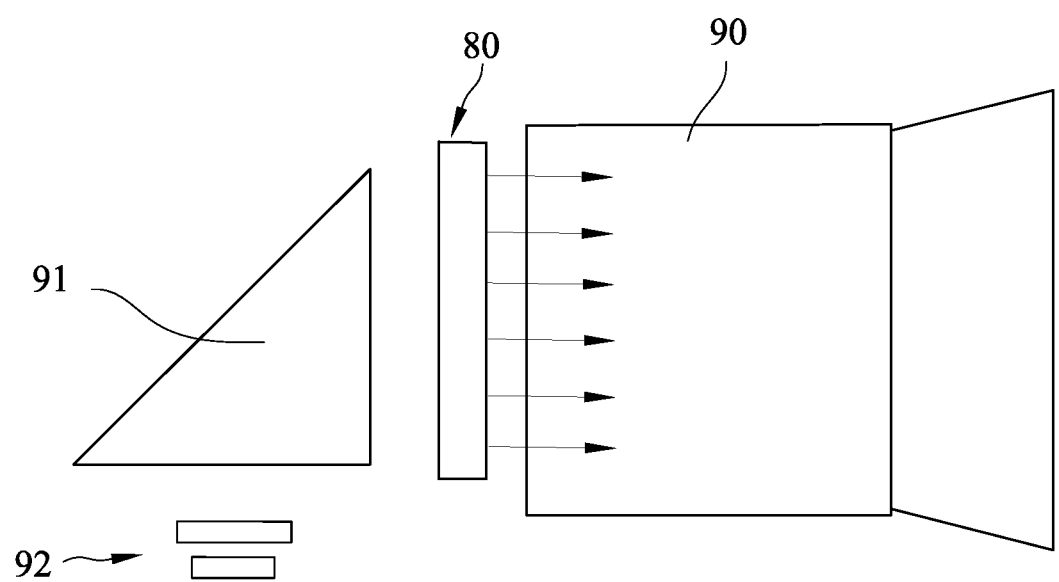
FIG. 11 is a schematic view illustrating a use of an optical actuator.
Figure 12:
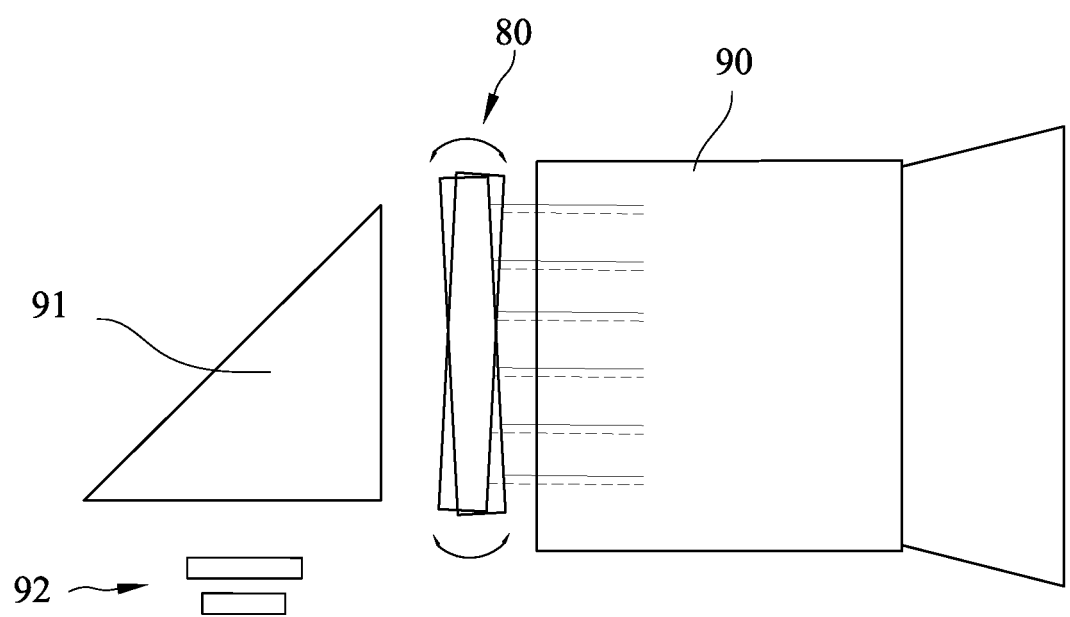
FIG. 12 is another schematic view illustrating the use of the optical actuator.
Figure 13:
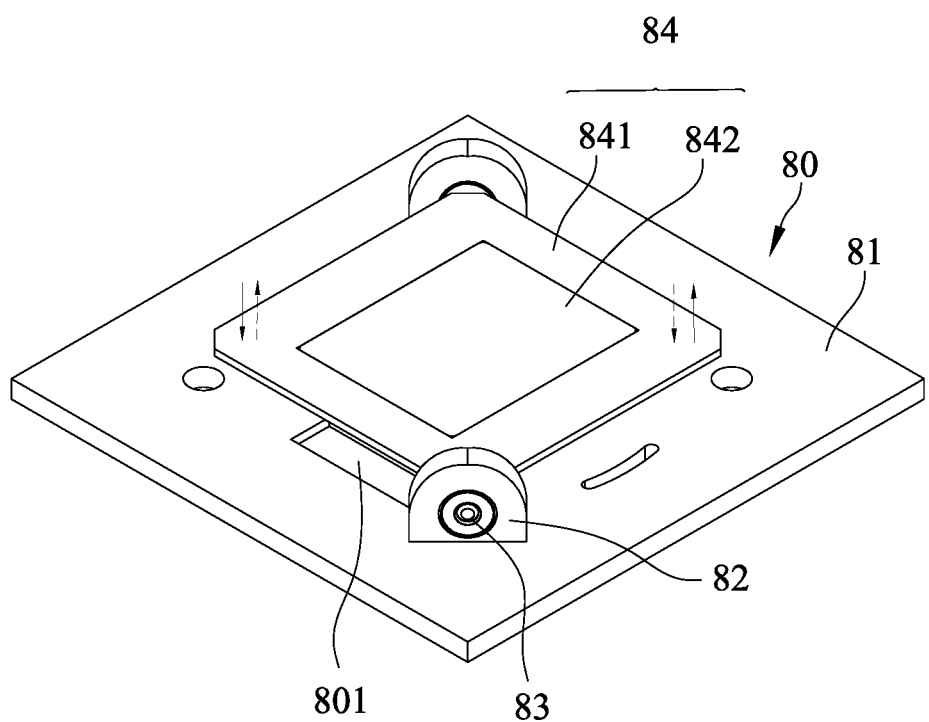
FIG. 13 is a perspective view illustrating a structure of a conventional single-axis optical actuator.
Figure 14:
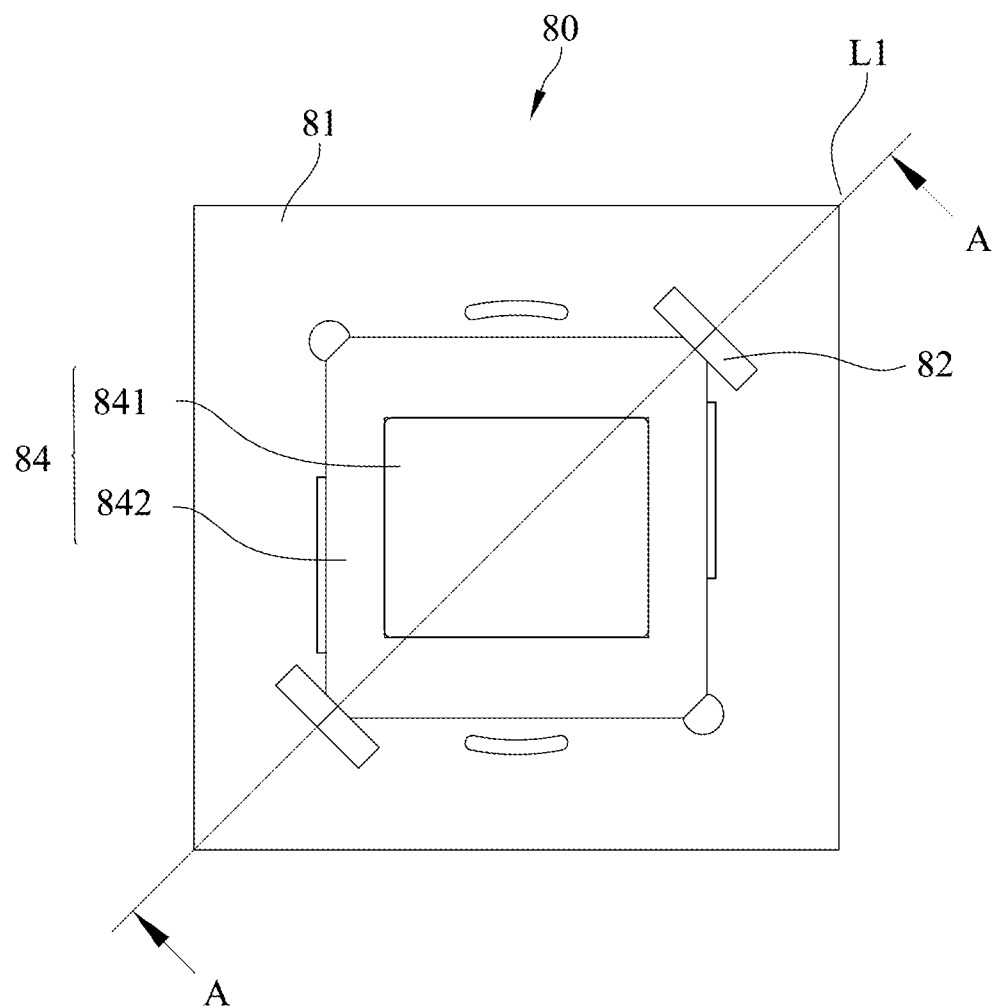
FIG. 14 is a plan view of the arrangement shown in FIG. 13.
Figure 15:
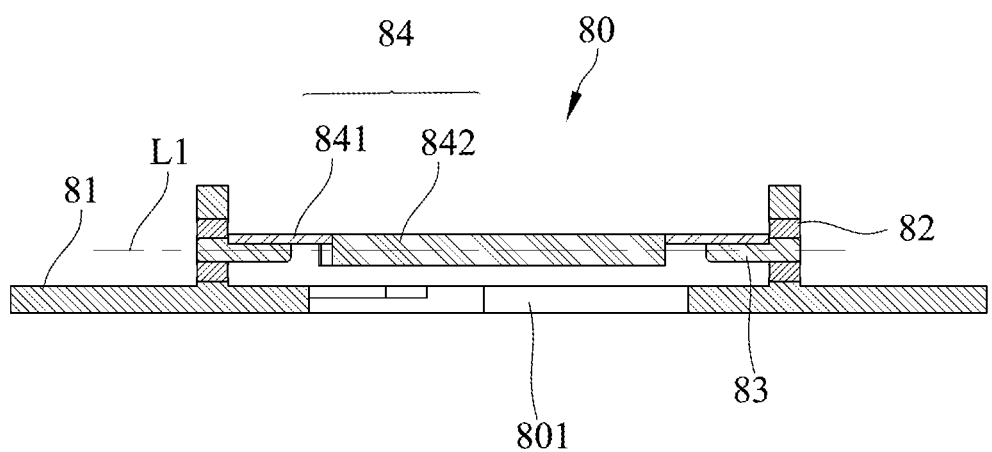
FIG. 15 is a cross-sectional view taken along line A-A of FIG. 14.

Referring to FIGS. 8, 9, and 10, a reinforcement frame 70, which is preferably made of metal, is arranged on the elastic suspension plate 60 and is formed with a light transmission opening 700 in a central area thereof. The reinforcement frame 70 is provided with a pillow plate 701, 702 at each of two ends thereof to receive the fitting wing plates 61G, 61H, 61I, 61J of the cantilever arms 61C, 61C' of the elastic suspension plate 60 to abut thereon. The reinforcement frame 70 is provided with an insertion plate 71 and a supporting plate 72 that are respectively formed on inner and outer edges of one 701 of the pillow plates to retain and fix the magnetic device 73 in position. In an embodiment (see FIGS. 9 and 10), the insertion plate 72 is arranged to extend through a coil 731 of the magnetic device 73 and the supporting plate 72 abuts one side of a magnet 732 so as to retain and fix the magnetic device 73 between the reinforcement frame 70 and the elastic suspension plate 60.

To use the second embodiment of the present invention, as shown in FIGS. 7B, 9, and 10, since the elastic suspension plate 60 is supported by the fitting wing plates 61G, 61H, 61I, 61J on the ends of the two cantilever arms 61C, 61C' inside the reinforcement frame 70, when an electrical current is supplied through the connector 74 to the magnetic device 73, an end of the frame body 61 of the elastic suspension plate 60 is subjected to an effect of magnetic attraction or repulsion generated by the magnetic device 73, so that about an axis defined by an imaginary axis line L3 between the two bending sections 61B of the frame body 61, two opposite side portions of the frame body 61 are caused to generate fast but position-constrained oscillation. Due to an optical lens 51 being carried by and supported on the frame body 61 and the inlay pieces 631, 632, 633, 634, fast oscillation of light for positioning can be achieved.

In light of elaborative idea involved in the arrangement of this invention, the following advantages are achieved in respect of use and fabrication:

(1) Since in the suspension system of the present invention, the elastic suspension plate includes a frame body made of a large piece of metal plate to carry an optical lens, with cantilever arms extended from bending sections formed on two diagonal lines of the frame body, when a magnetic device is activated to cause attraction or repulsion to one end of the elastic suspension plate, the elastic suspension plate may use an imaginary axis line between the two bending sections of the frame body as an axis to allow the optical actuator to carry out extremely accurate two angular displacements, with accurate angle and extreme endurability, this being the primary advantage of this invention.

(2) Since the elastic suspension plate of this invention is formed by pressing or stamping a large piece of metal plate, the fabrication is made simple and easy and assembly is easy and reliable, with ease and simplicity of assembling with the oscillation member and operations, occupying a reduced amount of space to thereby facilitates warehousing management, this being another advantage of this invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A single-axis optical actuator suspension system, comprising at least:
    a base, which is formed with a rectangular light transmission opening in a central area thereof and is provided with a support post on each of two opposite sides along a diagonal line of the light transmission opening, and is further provided with a magnetic device on a long side of the rectangular light transmission opening, a connector being provided at an end of the base;
    a reinforcement frame, which is arranged under the base and is formed with a light transmission opening in a central area thereof, a supporting plate and an insertion plate being provided and projecting outward from one side of the light transmission opening to extend through the base in order to retain and fix the magnetic device;
    an elastic suspension plate, which is in the form of a flat metal plate and comprises a frame body, which defines a light transmission opening in a center thereof, the frame body being provided with a beveled edge at each of two opposites side along a diagonal line thereof, the beveled edge being provided with a bending section on an outside thereof and extended outward from the frame body to form a cantilever arm such that a spacing gap is formed between an inner side of the cantilever arm and an outer side of the beveled edge;
    an oscillation member, which comprises a carrying plate form that is formed with a light transmission opening in a central area thereof, the light transmission opening having an inner flange that forms a lens support trough to receive an optical lens to fit and fix therein; and
    two fasteners, which are respectively put through outer ends of the cantilever arms that extend from two ends of the elastic suspension plate and are fixed to the two support posts of the base so that the elastic suspension plate and the oscillation member carry and support the optical lens wherein the fasteners at the two ends of the elastic suspension plate serve as supports to support the oscillation member that carries the optical lens thereon above the light transmission opening of the base and wherein under an action of the magnetic device, the oscillation member is caused to move such that two sides of the oscillation member fast oscillate about an axis defined by an imaginary axis line between flexing points of the two bending sections of the elastic suspension plate.

2. The single-axis optical actuator suspension system according to claim 1, wherein the two support posts comprise positioning markings and positioning plates that are matingly engageable with the elastic suspension plate.

3. The single-axis optical actuator suspension system according to claim 2, wherein the positioning markings of the two support posts are positioning tenons and the elastic suspension plate is provided with a positioning recess corresponding to each of the positioning tenons.

4. The single-axis optical actuator suspension system according to claim 1, wherein the cantilever arms of the elastic suspension plate are each formed with a reduced necking section at an inner end thereof adjacent to the bending section and are each formed with a fastener hole in an outer end thereof.

5. The single-axis optical actuator suspension system according to claim 1, wherein the cantilever arms each have an inner side that is parallel to an outer side of the beveled edge of the light transmission opening.

6. The single-axis optical actuator suspension system according to claim 1, wherein the frame body has a periphery that is formed, through recessing, a plurality of fitting notches.

7. The single-axis optical actuator suspension system according to claim 1, wherein the insertion plate of the reinforcement frame extends through a coil of the magnetic device and the supporting plate abuts one side of a magnet.

8. The single-axis optical actuator suspension system according to claim 1, wherein the cantilever arms of the elastic suspension plate are each formed with a reduced necking section at an inner side thereof adjacent to the bending section.

* * * * *